(12) United States Patent
Kim

(10) Patent No.: US 8,102,995 B2
(45) Date of Patent: Jan. 24, 2012

(54) COMMUNICATION DEVICE AND TELEPHONE COMMUNICATION METHOD THEREOF

(75) Inventor: Sang Oh Kim, Siheung (KR)

(73) Assignee: LG Electronics Inc., Seoul (KR)

( * ) Notice: Subject to any disclaimer, the term of this patent is extended or adjusted under 35 U.S.C. 154(b) by 604 days.

(21) Appl. No.: 11/687,221

(22) Filed: Mar. 16, 2007

(65) Prior Publication Data
US 2007/0218959 A1 Sep. 20, 2007

(30) Foreign Application Priority Data

Mar. 20, 2006 (KR) .................. 10-2006-0025412

(51) Int. Cl.
*H04M 9/00* (2006.01)
*H04M 1/00* (2006.01)
(52) U.S. Cl. ............. 379/420.03; 381/86; 455/569.2
(58) Field of Classification Search .......... 379/430, 379/420.03, 420.02, 444; 455/569.1, 575.1; 381/86, 386, 111–115, 122, 71.4, 71.7, 71.8, 381/71.3, 94.1
See application file for complete search history.

(56) References Cited

U.S. PATENT DOCUMENTS

| 5,546,458 | A | * | 8/1996 | Iwami | 379/392.01 |
| 6,029,072 | A | * | 2/2000 | Barber | 455/557 |
| 6,094,496 | A | * | 7/2000 | Stowers, Sr. | 381/362 |
| 6,278,377 | B1 | * | 8/2001 | DeLine et al. | 340/815.4 |
| 7,266,204 | B2 | * | 9/2007 | Watson et al. | 381/86 |

FOREIGN PATENT DOCUMENTS

| GB | 2327012 | 1/1999 |
| KR | 10-0233166 | 9/1999 |

* cited by examiner

*Primary Examiner* — Davetta W Goins
*Assistant Examiner* — Phylesha Dabney
(74) *Attorney, Agent, or Firm* — Fish & Richardson P.C.

(57) ABSTRACT

The present invention relates to a communication device and a telephone communication method thereof. The present invention includes two or more microphones mounted at different positioned in a predetermined space, e.g., in a vehicle. Further, a detector compares selectively the signal-to-noise ratios, sound quality states, volume intensities or the like of signals input through the microphones, and detects the most optimal signal as a telephone communication signal in the signals. Echo and/or howling contained in the input signal when one talks over the telephone with a communication counterpart is removed through an echo remover in accordance with the control operation of a controller. Furthermore, if signals are input to the others of the microphones while the telephone communication is performed, the telephone communication is continuously performed by comparing the input signals with the signal input to the microphone through which the telephone communication has been performed and selecting a microphone with the most optimal telephone communication signal. Accordingly, there is an advantage in that occupants except a driver can conveniently talk over the telephone using any one of two or more microphones installed in a vehicle, and the telephone communication can be performed with an optimal telephone communication signal although a talker is changed.

18 Claims, 7 Drawing Sheets

COMMUNICATION DEVICE AND TELEPHONE COMMUNICATION METHOD THEREOF

BACKGROUND

1. Field

The present application relates to a communication device in which two or more microphones are installed in a predetermined space and any one of signals input from the microphones is selected, whereby telephone communication is performed, and a telephone communication method of the communication device.

2. Description of the Related Art

A hands-free device or telematics terminal device is installed inside a vehicle such that telephone communication can be easily performed during driving. Further, in addition to a microphone for a body mounted to the hands-free device or telematics terminal device, a microphone is mounted to a dashboard, a steering wheel, a ceiling above a driver's seat, or the like such that driver's voice can be well transmitted to a communication counterpart. Furthermore, such a device causes the communication counterpart's voice to be output through an audio system of the vehicle.

A driver can safely and conveniently talk over the telephone using such a telephone communication device even during driving.

However, since a microphone for telephone communication is currently mounted in a vehicle at a position adjacent to a driver's seat, such as a dashboard, a steering wheel, a ceiling of the driver's seat, as described above, an occupant sitting on a passenger's seat or rear seat has a difficulty in performing telephone communication using the microphone.

That is, the telephone communication using a hands-free device or telematics terminal device may be performed by not only a driver or an occupant sitting on a passenger's seat but also another occupant sitting on rear seats. However, in this case, since a microphone is mounted only to a side of a driver's seat, there is a problem in that a voice signal is not precisely transmitted to a communication counterpart due to a howling phenomenon or the like caused by a distance between a sound source and a microphone.

Further, a telematics terminal device provides not only telephone communication function but also various additional functions of voice recording and the like using a microphone function. However, in a case where an occupant sitting on a passenger's seat or rear seat records his or her voice, a voice signal is not precisely transmitted to a microphone mounted to the telematics terminal device, whereby the voice recording is not well performed.

SUMMARY

Accordingly, the present invention is conceived to solve the aforementioned problems in the prior art. An object of the present invention is to provide a communication device, in which two or more microphones are installed in a predetermined space and any one of signals input from the microphones is detected, whereby a telephone communication is performed, and a telephone communication method of the communication device.

Another object of the present invention is to enable a changed talker to talk over the telephone continuously through an optimal voice signal even in a case where a talker is changed during the telephone communication.

A further object of the present invention is to enable an occupant to easily record his or her own voices even at rear seats of a vehicle.

A still further object of the present invention is to cause a voice signal with clear sound quality in telephone communication or voice recording to be provided.

According to an aspect of the present invention for achieving the objects, there is provided a communication device, comprising: A plurality of microphones for receiving input signals; a detector for detecting any one of signals input from the plurality of microphones; and a controller for controlling telephone communication to be performed using the detected signal.

According to another aspect of the present invention for achieving the objects, there is provided a communication device, comprising: A first microphone for receiving a first input signal; one or more second microphones for receiving second input signals; a detector for comparing the first and second input signals and detecting a third signal; and a controller for controlling telephone communication to be performed using the third signal.

The detector comprises a sound quality comparator for comparing sound qualities of the input signals and detecting the third signal.

The detector comprises a volume comparator for comparing volume intensities of the input signals and detecting the third signal.

The detector comprises a signal-to-noise ration (SNR) comparator for comparing SNR changes of the input signals and detecting the third signal.

The SNR comparator comprises a diversity detector.

While telephone communication is performed using any one of the microphones, if an input signal of another of the microphones is detected as a telephone communication signal, the controller controls the telephone communication to be performed using the microphone of which the input signal is detected as the telephone communication signal.

According to a further aspect of the present invention for achieving the objects, there is provided a communication device, comprising: A plurality of microphones for receiving input signals; a selector for selecting any one of the plurality of microphones; and a controller for controlling telephone communication to be performed using a signal input through the selected microphone.

The selector comprises switching elements respectively connected to the microphones; and on/off buttons for close/open states of the respective switching elements.

The communication device may comprise an echo remover for removing echo or howling of the telephone communication signal.

According to an aspect of the present invention for achieving the objects, there is provided a telephone communication method of a communication device, comprising the steps of: receiving input signals from two or more microphones; comparing the input signals from the microphones with each other and detecting any one of the input signals; and performing telephone communication using the detected input signal.

According to another aspect of the present invention for achieving the objects, there is provided a telephone communication method of a communication device, comprising the steps of: receiving a first input signal from a microphone; receiving second input signals from one or more other microphones; comparing the first and second input signals and detecting a third input signal out of the input signals; and performing telephone communication using the detected third input signal.

The telephone communication method may comprise the steps of comparing the first and second input signals, and detecting a first temporary signal out of the input signals; performing the telephone communication using the first temporary signal; comparing the first temporary signal with the other input signals except the first temporary signal, and detecting a second temporary signal; and continuously comparing the first temporary signal, with which the telephone communication has been performed, with the second temporary signal and performing the telephone communication using any one of the first and second temporary signals in accordance with the compared result.

The signal detection is performed by comparing sound qualities of the signals and detecting a signal with the most exact sound quality state.

The signal detection is performed by comparing volume intensities of the signals and detecting a signal with the largest volume intensity.

The signal detection is performed by comparing SNRs of the signals and detecting a signal with the largest SNR change.

The signal detection is performed through a diversity scheme.

The telephone communication method comprises a signal is detected using one or more of methods of comparing the sound qualities, the volume intensities and the SNR changes of the signals.

The telephone communication method further comprises a step of removing echo or howling of the detected signal.

According to a further aspect of the present invention for achieving the objects, there is provided a telephone communication method of a communication device, comprising the steps of: A telephone communication method of a communication device, comprising the steps of: selecting any one of two or more microphones; and performing telephone communication using a voice signal input from the selected microphone.

The others of the microphones except the selected microphone are in a turned off state where their powers are cut off.

The telephone communication method further comprises the step of removing echo or howling of the voice signal.

As described above, in a communication device and a telephone communication method thereof according to the present invention, an optimal signal is detected out of the signals input from two or more microphones installed in a predetermined space, such as the interior of a vehicle, and telephone communication is performed using the microphone to which the voice corresponding to the detected signal is input.

Further, it can be seen that a voice signal can be easily recorded in a telematics terminal device installed in a vehicle using the microphones even at a rear seat of the vehicle.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION

Hereinafter, a communication device having two or more microphones and a telephone communication method of the communication device will be described in detail with reference to the accompanying drawings.

Voice signals of occupants in a vehicle are input through microphones installed to all seats. Further, an optimal signal, with which telephone communication can be performed, is detected out of the input signals using a diversity, scheme. Alternatively, after the volume intensity, sound quality state and the like of the input signals are compared with one another and a signal is detected in accordance with the compared results, telephone communication is performed through the detected signal.

A telephone communication method using any one of two or more microphones through the method described above will be described below.

Figure 1:
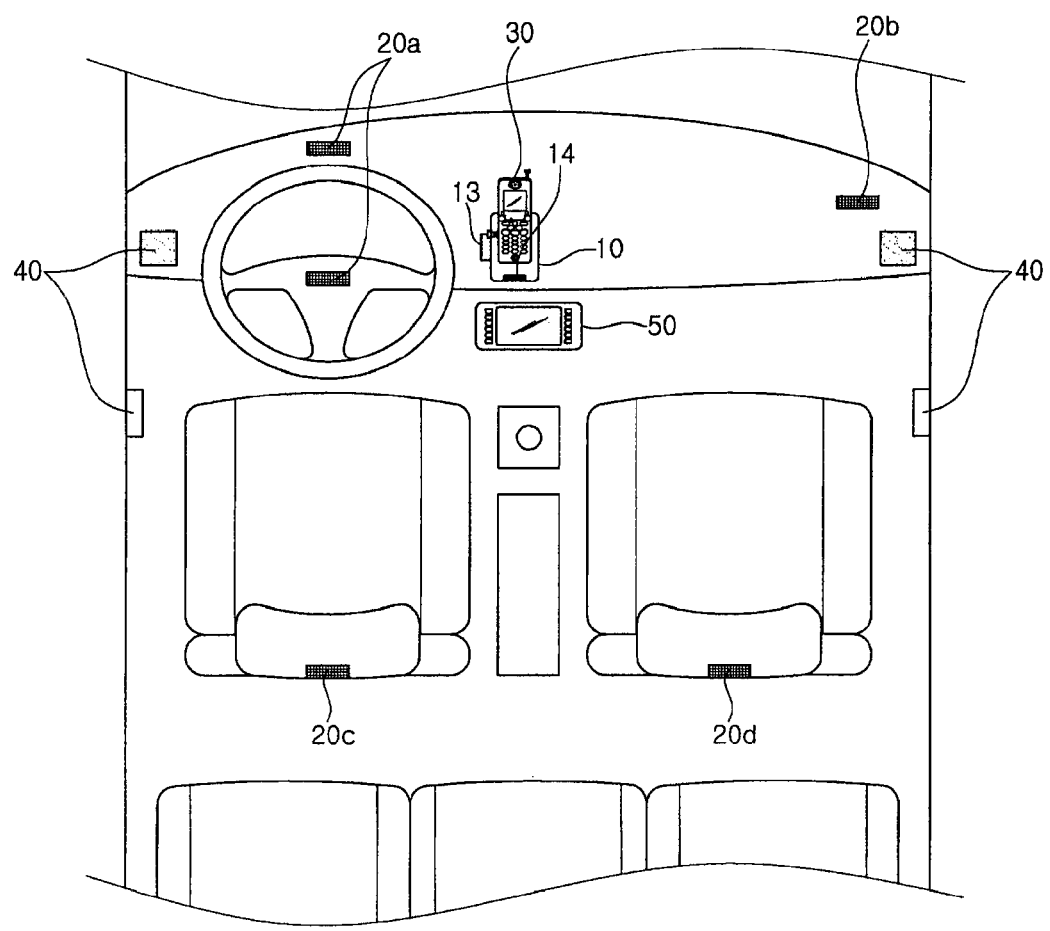
FIG. 1 is an exemplary view illustrating a communication device installed in a vehicle according to embodiments of the present invention.

FIG. 1 is an exemplary view illustrating a communication device installed in a vehicle according to embodiments of the present invention. Further, FIG. 2 is block diagram, showing a configuration of a communication device according to a first embodiment of the present invention.

Figure 2:
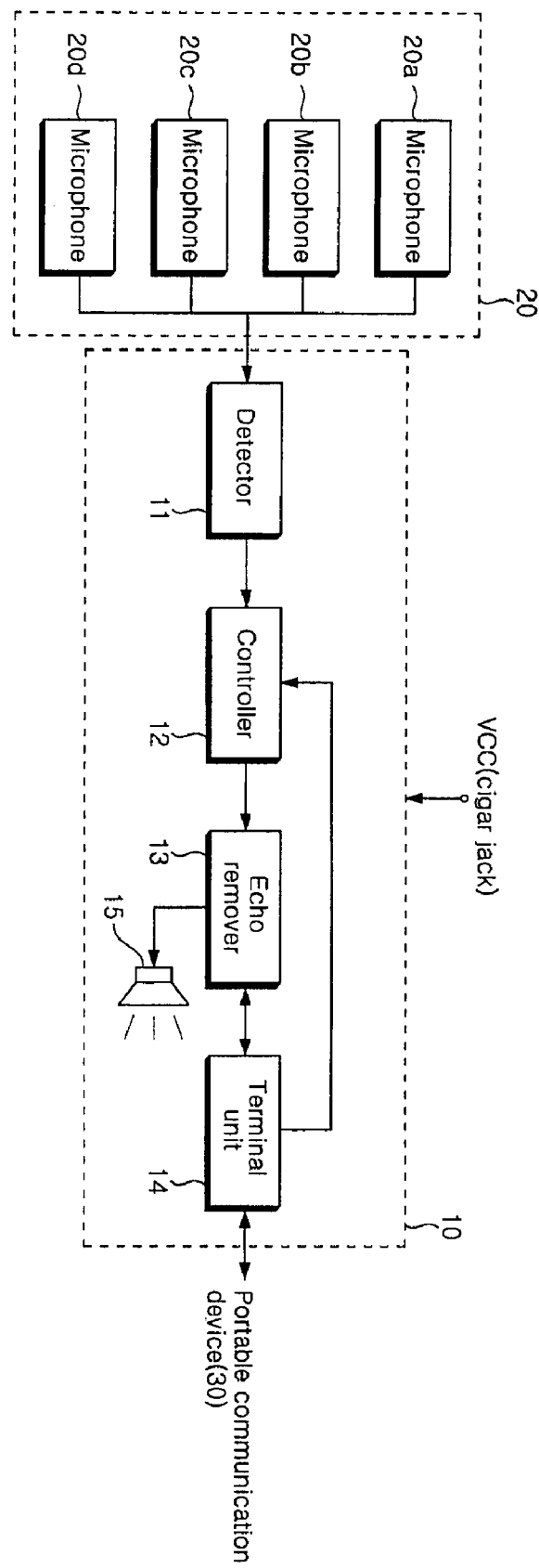
FIG. 2 is block diagram showing a configuration of a communication device according to a first embodiment of the present invention.

Referring to FIGS. 1 and 2, in a vehicle, there are provided a plurality of microphones 20 (20a, 20b, 20c and 20d) at different positions and a hands-free body 10 connected to the microphones 20 and having a portable communication device 30, such as a mobile phone or personal digital assistant (PDA), seated on the hands-free body 10. The portable communication device 30 and the hands-free body 10 are connected to each other through a connection terminal unit 14.

Each of the microphones 20 is mounted at a position suitable for recognizing the voice signal of the occupant. The microphone 20a for a driver is mounted to a ceiling of the driver's seat or a steering wheel. Further, the microphone 20b for an occupant sitting on a passenger's seat is mounted to a ceiling of the passenger's seat. Furthermore, the microphones 20c and 20d are mounted to the rear sides of the driver's and passenger's seats, respectively. It will be apparent that each of the microphones 20 may be mounted at another position depending on the position of an occupant. Each of the microphones 20a, 20b, 20c and 20d functions to receive voice signals as input signals.

The hands-free body 10 is provided with a detector 11 for detecting the optimal signal, with which the telephone communication can be performed, out of the signals input through the plurality of microphones 20. In this embodiment, the detector 11 comprises a signal-to-noise ratio comparator, i.e., a diversity detector, for comparing the signal-to-noise ratios (SNRs) of the input signals and then detecting a signal with the largest change in SNR. The SNR is a ratio of a voice signal input to each microphone 20 to a noise. Decibel (dB) is used as a unit of the SNR. Accordingly, detected is a signal input from a microphone near an occupant, who talks over the telephone, among the microphones mounted to respective seats. In addition, the detector 11 may comprise a sound quality comparator for comparing the signal properties of the input signals and then detecting a signal with superior sound quality. Further, the detector 11 may comprise a volume comparator for comparing the volumes of the input signals and then detecting a signal with the largest volume.

While the telephone communication is performed through a selected microphone, the detector 11 detects the most optimal signal for the telephone communication by continuously comparing a voice signal input to the selected microphone with voice signals input to the other microphones.

There is provided a controller 12 for controlling the telephone communication to be performed with a counterpart using the microphone corresponding to a signal detected by the detector 11. If a voice signal input to another microphone is detected as the most optimal signal by the detector while the telephone communication is performed once, the controller 12 controls the telephone communication to be performed using a microphone corresponding to the newly detected signal.

There is provided an echo remover 13 for removing echo or howling contained in a voice signal when the telephone communication is performed through the control operation of the controller 12. The echo remover 13 is used as a means for overcoming a specific environmental limitation such as the interior of a vehicle. That is, the echo remover 13 is used to remove the howling generated when a sound output through a speaker 15 or a receiver of the portable communication device 30 is again input to the microphones 20, and the echo generated due to the phenomenon that a voice of a talker is reflected onto a ceiling, a seat, a window or the like in a closed vehicle and then returns to the microphones 20. Further, the echo remover 13 removes the echo and howling of a signal transmitted from the portable communication device 30 to transmit the signal to the speaker 15.

The speaker 15 functions to output a voice signal of a communication counterpart or various kinds of sound source data stored in a telematics terminal device 50. The speaker 15 is a speaker provided in the hands-free body 15 or an internal speaker 40 in a vehicle.

Hereinafter, a telephone communication method using any one of microphones installed in a vehicle using the communication device of the present invention provided with a configuration described above will be described with reference to the flowcharts illustrated in FIGS. 3a to 3c.

Figure 3A:
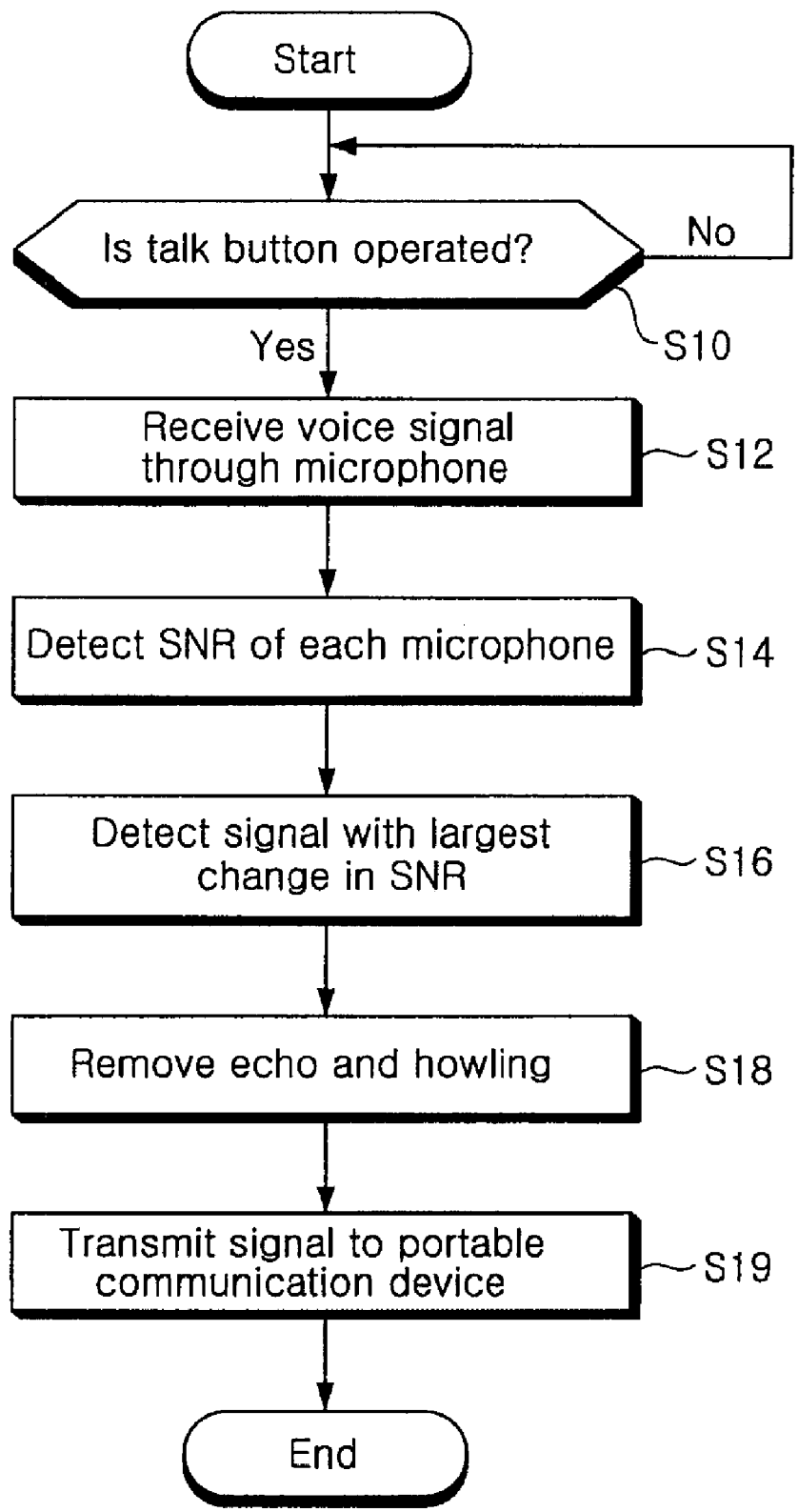
FIGS. 3a to 3c are flowcharts illustrating telephone communication methods using the communication device shown in FIG. 2.

FIG. 3a is a flowchart illustrating a telephone communication method using any one microphone selected by detecting SNRs of signals of the respective microphones.

In step S10 of FIG. 3a, the communication device waits until a talk button (not shown) provided in the hands-free body 10 or portable communication device 30 is operated by an occupant so as to make a telephone call or to answer the telephone.

If the talk button is operated and a voice signal of the occupant is received through the microphones 20 in step S12, the detector 11 detects the SNRs of the signals received through the microphones 20 in step S14.

Then, the changes of the detected SNRs are compared with each other and the signal having the largest change thereof is detected as a talk signal in step S16. For example, in a case where an occupant sitting on the rear of a passenger's seat intends to talk over the telephone, the change of the SNR of the fourth microphone 20d among the microphones 20a, 20b, 20c and 20d is the largest. For this reason, the detector 11 detects the voice signal input from the fourth microphone 20d as a talk signal.

Accordingly, the occupant can talk over the telephone with a communication counterpart using the fourth microphone 20d. At this time, the echo and howling generated in the telephone communication are removed by the echo remover (step S18). Further, the signal from the echo remover 13 is transmitted to the portable communication device 30 mounted to the hands-free body 10, so that the telephone communication is performed with exact voice signals (step S19).

Figure 3B:
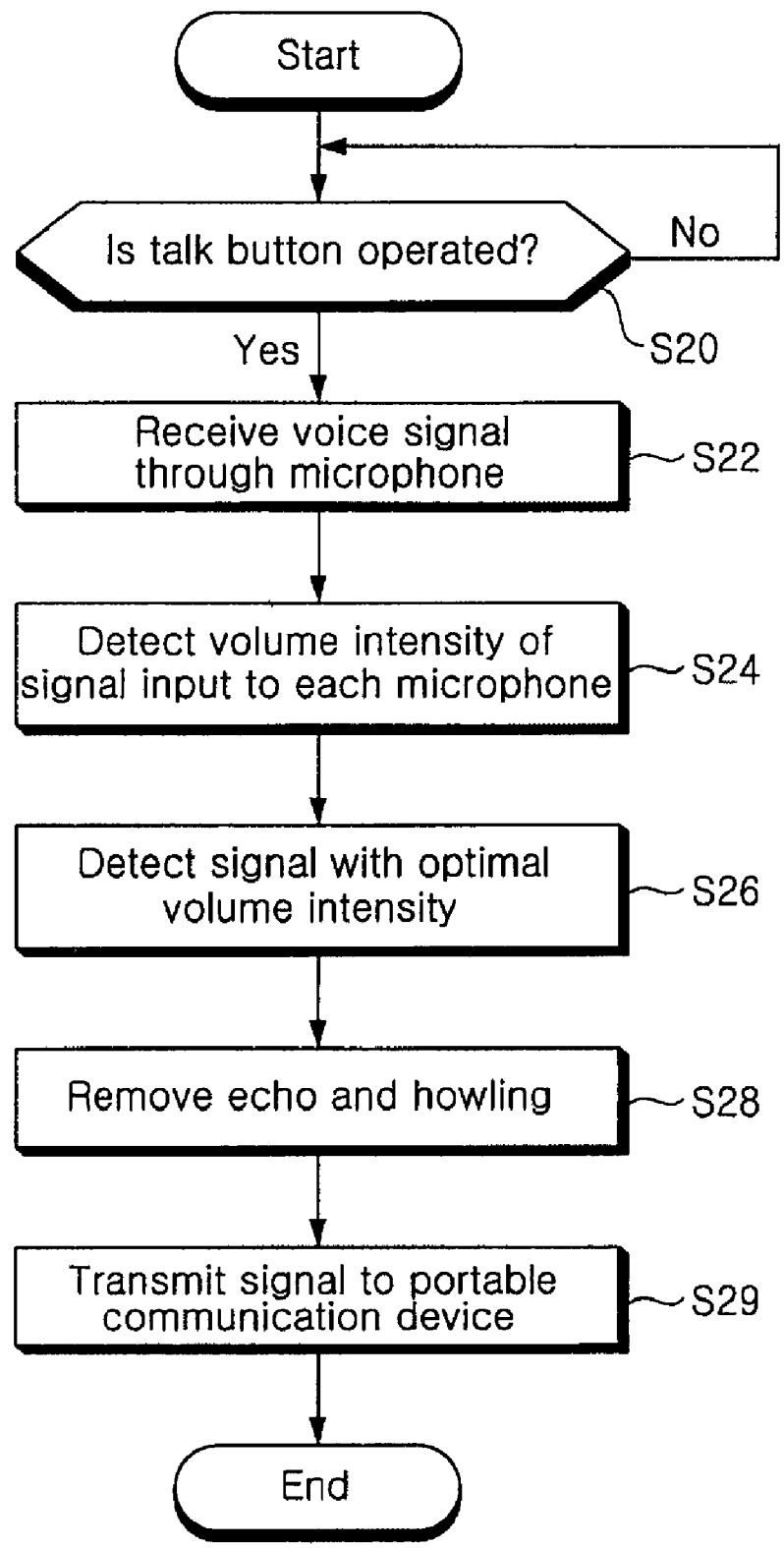
Figure 3C:
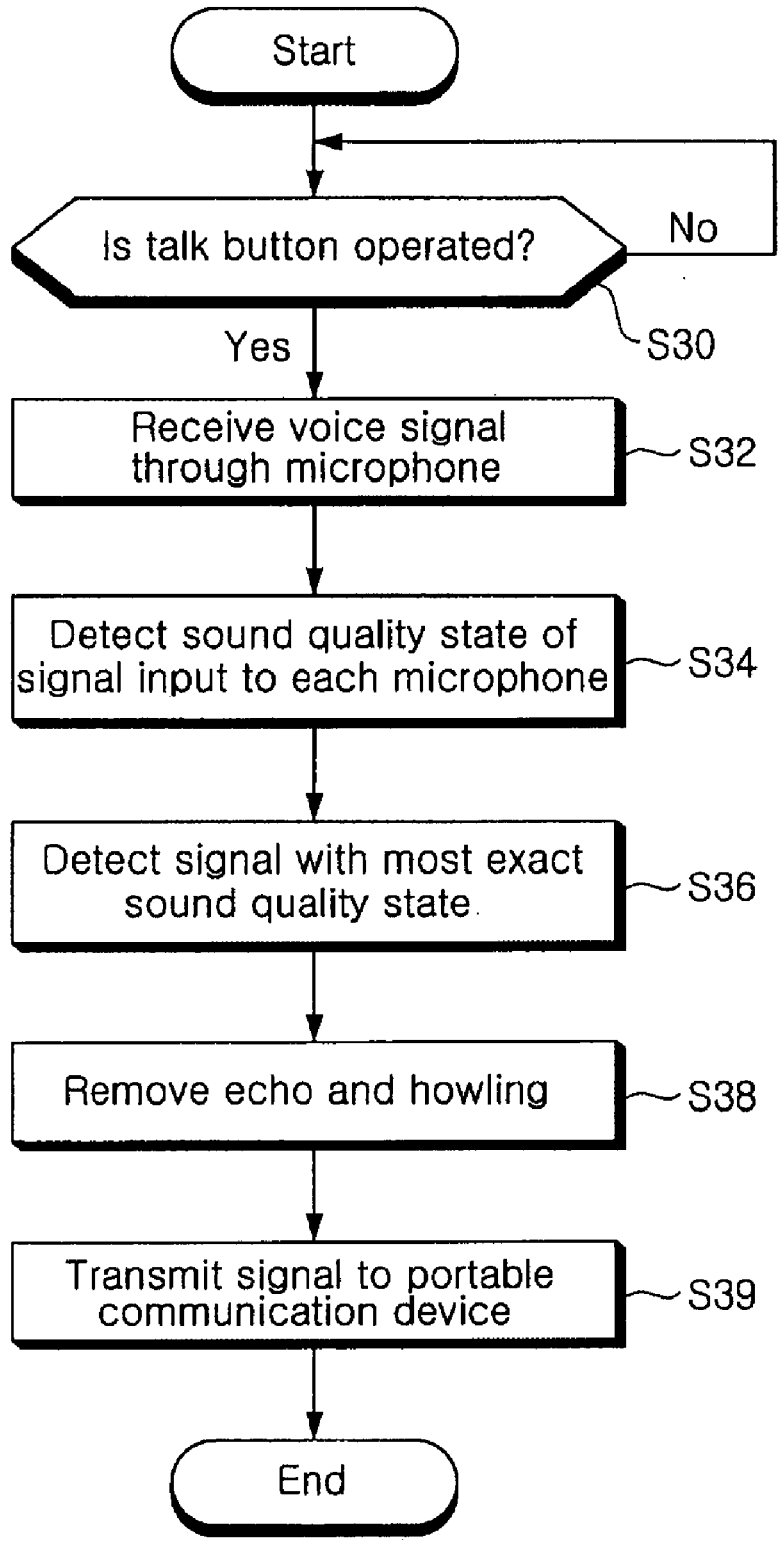

FIGS. 3b and 3c are flowcharts illustrating telephone communication methods using detecting the volume intensity and the sound quality state of a voice signal input to a microphone, respectively.

The telephone communication methods according to FIGS. 3b and 3c, in which the volume intensity and the sound quality state are determined and then the corresponding microphone is selected, are performed similarly to the method described in FIG. 3a, so that the same technical description will be omitted.

However, FIG. 3b is different from FIG. 3a in the steps of detecting the volume intensities of the signals input to the respective microphones (step S24) and detecting a signal with the most optimal volume intensity from the detection step (step S26). The optimal volume intensity is an intensity with which a voice signal most suitable for telephone communication is input to a microphone. Such a volume intensity may be selected by a user. Further, FIG. 3c is different from FIG. 3a in the steps of detecting the sound quality states of the signals input to the respective microphones (step S34) and detecting a signal with the most exact sound quality state from the detection step (step S36).

Accordingly, the volume intensities or the sound quality states of the signals input to the respective microphones are compared instead of the changes of SNRs described in FIG. 3a, and the telephone communication can be performed through the microphone corresponding to the signal with the most exact sound quality state or the most optimal volume intensity.

Here, the telephone communication may be performed by combining two or more of the methods, in which the SNRs, sound quality states, volume intensities and the like are compared. That is, a microphone corresponding to a signal with the largest change of SNR may be selected in an initial communication, and a microphone corresponding to a signal with the best sound quality state may be then selected.

Meanwhile, there is a case where a signal is input to other microphones while the telephone communication is performed through the microphone selected through the methods described in FIGS. 3a to 3c. In this case, after the signal input to the microphone through which the telephone communication is currently performed is compared with the signals input to the other microphones and a signal most suitable for the telephone communication is detected as the compared result, the telephone communication is continuously performed with the most suitable signal.

Figure 4:
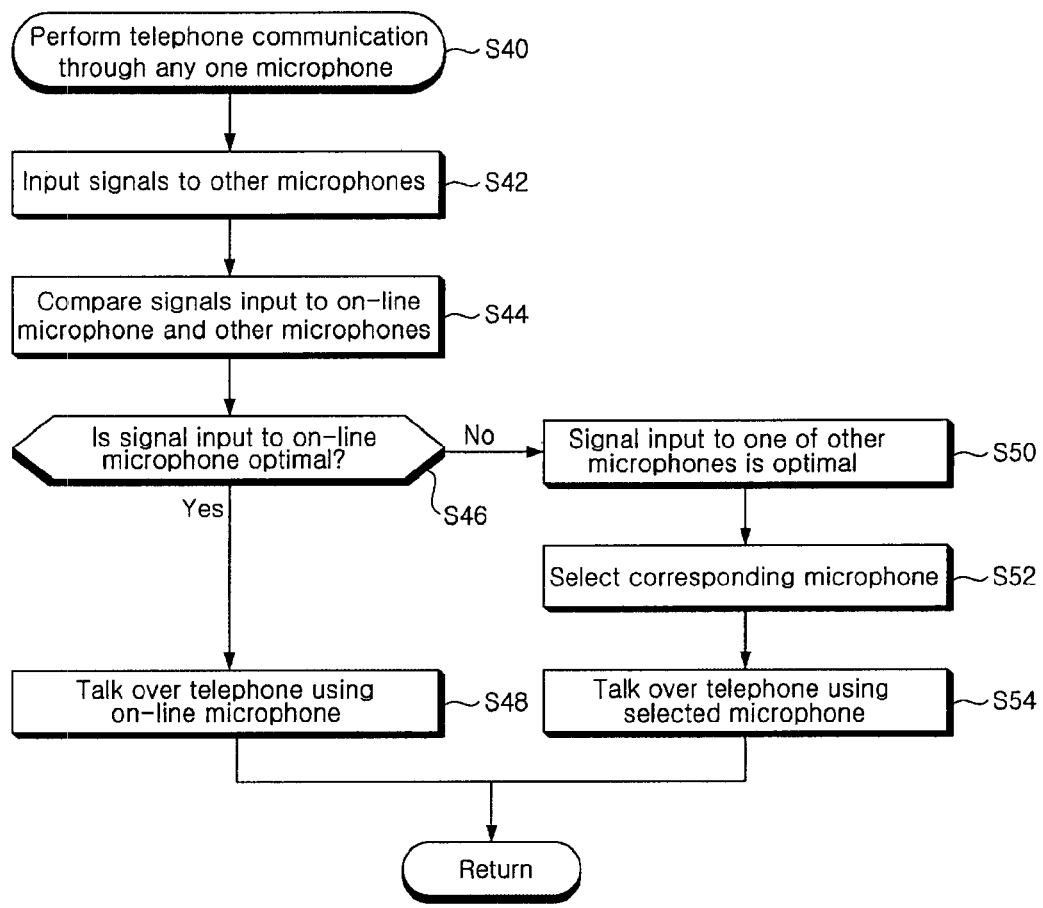
FIG. 4 is a flowchart illustrating a telephone communication method when a signal is input to other microphones during the telephone communication according to FIGS. 3a to 3c.

FIG. 4 shows a flowchart of a telephone communication method when a signal is input to other microphones during the telephone communication according to FIG. 3 as described above.

The telephone communication method will be described with reference to FIG. 4. While telephone communication is performed through the first microphone 20a in step S40, signals can be input from the other microphones 20b, 20c and 20d as in step S42. Then, if voice signals are input from the other microphones 20b, 20c and 20d except the first microphone 20a through which the telephone communication is currently performed, the detector 11 compares the input voice signals with the voice signal input to the first microphone 20a in step S44.

If the voice signal input to the first microphone 20a is determined to be the most optimal signal in step S46, the telephone communication is continuously performed using the first microphone 20a in step S48. However, if a signal input to any one of the other microphones 20b, 20c and 20d, e.g., the microphone 20c mounted to the rear of a driver's seat, is detected as the optimal signal compared with the signal input to the first microphone 20a in step S50, the controller 15 selects the microphone 20c (step S52) and causes the telephone communication to be performed (step S54).

Further, there is a case where input signals are again produced from the other microphones 20a, 20b and 20d while the telephone communication is performed using the microphone 20c. At this time, the telephone communication is also performed using the optimal signal selected by comparing the signal input to the microphone 20c with the signals input to the other microphones 20a, 20b and 20d. Such a process is continuously repeated until the telephone communication ends. The detected optimal signal is a signal with the largest, the most appropriate volume intensity or the best sound quality state.

In the telephone communication method through the aforementioned process, a microphone receiving the most optimal signal out of signals input from two or more microphones mounted at different positions is selected and then the telephone communication is performed. Further, although a talker is changed while talking over the telephone, the communication is continuously performed using a microphone adjacent to the changed talker.

Figure 5:
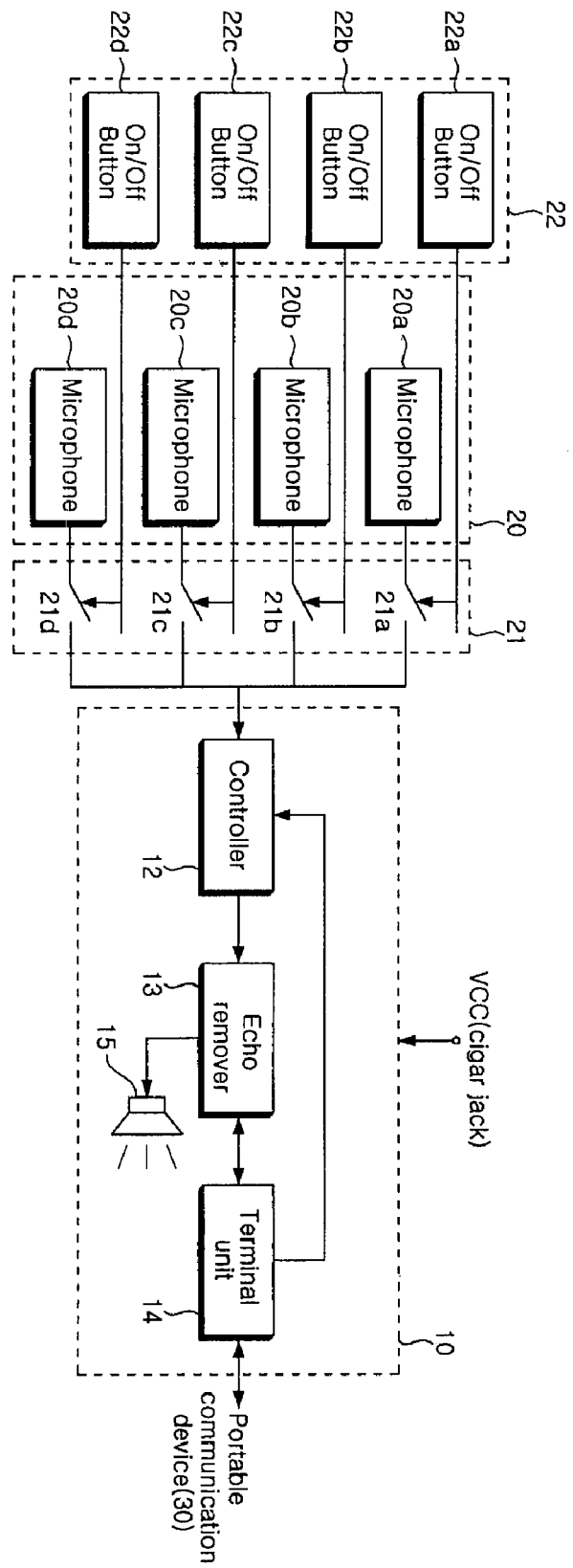
FIG. 5 is a block diagram showing a communication device according to a second embodiment of the present invention.

FIG. 5 is a block diagram showing a communication device according to a second embodiment of the present invention.

A plurality of microphones described in the second embodiment are also mounted at different positions in a vehicle.

In the second embodiment, there is provided a button operation unit 22 having on/off buttons 22a, 22b, 22c and 22d for respectively controlling the operation of microphones 20a, 20b, 20c and 20d. The on/off buttons 22a, 22b, 22c and 22d are buttons manually operated by occupants. The on/off buttons 22a, 22b, 22c and 22d are mounted at the positions corresponding to the installation positions of the microphones, respectively.

There is provided a switching unit 21 having switching elements 21a, 21b, 21c and 21d for causing voice signals through the corresponding microphones 20a, 20b, 20c and 20d to be transmitted or cut-off when the on/off buttons 22a, 22b, 22c and 22d of the button operation unit 22 are operated, respectively.

There is provided a controller 12 for controlling telephone communication to be performed through a microphone in which one of the switching elements 21a, 21b, 21c and 21d is turned on in accordance with the operation of the on/off buttons 22a, 22b, 22c and 22d. Further, there is provided an echo remover 13 for removing echo/howling contained in a voice signal in accordance with the control operation of the controller 12 when the telephone communication is performed. Furthermore, there is provided a terminal unit 14 for connecting the controller 12 and the echo remover 13 to a portable communication device 30.

In the communication device with such a configuration, the telephone communication is performed by selecting any one of a plurality of microphones in accordance with the manual operation of an occupant who intends to talk over the telephone. At this time, the other microphones are in a turned off state.

That is, if the occupant who intends to talk over the telephone turns on an on/off button adjacent to him or her, the corresponding switching element is in a close state, and thus, the telephone communication path is formed.

Then, the occupant can talk over the telephone with a communication counterpart through the telephone communication path that has been formed.

If the telephone communication ends, the occupant, who has talked over the telephone, operates again the operated on/off button to allow the switching element from the currently close state to an open state.

In the aforementioned second embodiment, the talker can conveniently talk over the telephone at his or her own seat without other passengers' disturbances.

Meanwhile, in the first and second embodiments, there is provided the telephone communication method using a hands-free scheme. However, such a telephone communication method may be performed in the same manner even when using the telematics terminal device 50. Further, the telematics terminal device provides various additional functions including voice recoding in addition to the telephone communication function.

Accordingly, in a case where voice is recorded in the telematics terminal device 50 using a plurality of microphones installed in a vehicle, occupants sitting on a rear seat as well as a driver's or passenger's seat can easily have their voice to be recorded using the microphone 20c and 20d most adjacent to them. Further, since echo and howling contained in a voice signal input to the microphones 20c and 20 is removed by the echo remover 13, the voice signal is stored clearly.

As described above, the present invention can detect a microphone of an occupant talking over the telephone among two or more microphones installed in a vehicle.

Accordingly, the present invention can extend a telephone communication function to all the occupants as well as a driver. Even when a talker is changed, the telephone communication can be performed with the signal input from a microphone of the changed talker detected.

Further, echo and howling generated in a vehicle is removed, so that the telephone communication of superior quality can be performed.

Furthermore, an occupant sitting on a rear seat of a vehicle can also record his or her voice easily using an adjacent microphone.

Although the present invention has been described in connection with the preferred embodiments, the embodiments of the present invention are only for illustrative purposes. It will be understood by those skilled in the art that various changes and modifications can be made thereto without departing from the technical spirit and scope of the present invention. Accordingly, the technical scope of the present invention will be defined by the technical spirit of the appended claims.

What is claimed is:

1. An apparatus for processing voice signals in a vehicle, comprising:
   a first microphone installed in a vehicle;
   a first detector configured to detect at least two magnitudes of a first signal generated by the first microphone based on input received by the first microphone;
   a second microphone installed in the vehicle;
   a second detector configured to detect at least two magnitudes of a second signal generated by the second microphone based on input received by the second microphone;
   a selector configured to select at least one signal from among the first and second signals; and a controller configured to enable communications by transmitting the at least one selected signal to a portable communications device coupled to the apparatus, wherein the selector is configured to:
- determine a first magnitude of change in a signal-to-noise ratio (SNR) for the first signal by comparing the at least two magnitudes of the first signal,
- determine a second magnitude of change in an SNR for the second signal by comparing the at least two magnitudes of the second signal,
- compare the first magnitude of change in the SNR to the second magnitude of change in the SNR, and
- select the at least one signal from among the first and second signals based on which of the first and second magnitudes of change in the SNR is greater.

2. The apparatus of claim 1, wherein the selector is configured to determine an intensity of at least one voice characteristic within each of the first and second signals, to compare the intensity determined for each of the first and second signals, and to select at least one signal from among the first and second signals based on the comparison of the determined intensities.

3. The apparatus of claim 1, wherein the selector is configured to determine a sound quality of audible information within the first and second signals, to compare the sound quality determined for each of the first and second signals, and to select at least one voice signal based on the comparison of the determined sound qualities.

4. The apparatus of claim 1, wherein the selector is further configured to select the at least one signal from among the first and second signals based on a combination of which magnitude of change in the signal-to-noise ratio determined for each of the first and second signals is greater, an intensity of at least one voice characteristic within each of the first and second signals, and a sound quality of audible information within each of the first and second signals.

5. The apparatus of claim 1, wherein the selector is further configured to continuously select at least one signal from among the first and second signals as long as the controller enables communications.

6. The apparatus of claim 1, further comprising a talk button, wherein the selector is configured to be operable when the talk button is activated by a user.

7. The apparatus of claim 1, wherein the first microphone is installed in the vehicle in a first position nearest a first occupant seat of the vehicle and the second microphone is installed in the vehicle in a second position nearest a second occupant seat of the vehicle, the second position being different from the first position.

8. The apparatus of claim 7, wherein the first position is a section of a ceiling of the vehicle above a driver seat of the vehicle and the second position is a different section of the ceiling above a passenger seat of a vehicle.

9. A communication device for a vehicle, comprising:
- a first microphone installed in a vehicle and configured to receive at least two magnitudes of a first input signal;
- a second microphone installed in the vehicle and configured to receive at least two magnitudes of a second input signal;
- a detector configured to compare the first and second input signals and to generate a third signal; and
- a controller configured to control a communication to be performed using the third signal by transmitting the third signal to a portable communications device,
- wherein the detector comprises a signal-to-noise ratio (SNR) comparator configured to:
  - determine a first magnitude of change in an SNR for the first input signal by comparing the at least two magnitudes of the first input signal,
  - determine a second magnitude of change in an SNR for the second input signal by comparing the at least two magnitudes of the second input signal,
  - compare the first magnitude of change in the SNR to the second magnitude of change in the SNR and
  - generate the third signal based on which magnitude of the first and second magnitudes of change in the SNR is greater.

10. The communication device as claimed in claim 9, wherein the detector comprises a sound quality comparator configured to determine a sound quality of audible information within the first and second input signals, to compare the sound quality determined for each of the first and second input signals, and to generate the third signal based on the comparison of the determined sound qualities of the first and second input signals.

11. The communication device as claimed in claim 9, wherein the detector comprises a volume comparator configured to determine an intensity of at least one voice characteristic within each of the first and second input signals, to compare the intensity determined for each of the first and second input signals, and to generate the third signal based on the comparison of the determined intensities of the first and second input signals.

12. A communication method comprising:
- detecting at least two magnitudes of a first signal generated by a first microphone based on input received by the first microphone, the first microphone being installed in a vehicle;
- detecting at least two magnitudes of a second signal generated by a second microphone based on input received by the second microphone, the second microphone being installed in the vehicle;
- selecting at least one signal from among the first and second signals;
- generating a third signal by removing echo or howling from the selected at least one signal; and
- enabling communication based on the third signal by transmitting the third signal to a portable communications device,
- wherein selecting the at least one signal comprises:
  - determining a first magnitude of change in a signal-to-noise ratio (SNR) for the first signal by comparing the at least two magnitudes of the first,
  - determining a second magnitude of change in an SNR for the second signal by comparing the at least two magnitudes of the second signal,
  - comparing the first magnitude of change in the SNR to the second magnitude of change in the SNR, and
  - selecting the at least one signal from among the first and second signals based on which of the first and second magnitudes of change in the SNR is greater.

13. The method as claimed in claim 12, wherein selecting the at least one signal comprises determining an intensity of at least one voice characteristic within each of the first and second signals, comparing the intensity determined for each of the first and second signals, and selecting the at least one signal from among the first and second signals based on the comparison of the determined intensities of the first and second signals.

14. The method as claimed in claim 12, wherein selecting the at least one signal comprises determining a sound quality of audible information within the first and second signals, comparing the sound quality determined for each of the first and second signals, and selecting at least one voice signal based on the comparison of the determined sound qualities of the first and second signals.

15. A method of processing voice signals in a vehicle, comprising:
    receiving at least two magnitudes of a first signal at a first microphone installed in a vehicle;
    receiving at least two magnitudes of a second signal at a second microphone installed in the vehicle;
    generating a third signal based on the first and second signals; and
    performing a communication using the third signal by forwarding the third signal to a portable communications device,
    wherein generating the third signal comprises:
        determining a first magnitude of change in a signal-to-noise ratio (SNR) for the first signal by comparing the at least two magnitudes of the first signal,
        determining a second magnitude of change in an SNR for the second signal by comparing the at least two magnitudes of the second signal,
        comparing the first magnitude of change in the SNR to the second magnitude of change in the SNR, and
        generating the third signal based on which of the first and second magnitudes of change in the SNR is greater.

16. The method as claimed in claim 15, wherein generating the third signal comprises determining an SNR for each of the first and second signals, comparing the determined SNR for each of the first and second signals, and generating the third signal based on the comparison of the determined SNRs for the first and second signals.

17. The method as claimed in claim 15, wherein generating the third signal comprises determining an intensity of at least one voice characteristic within each of the first and second signals, comparing the intensity determined for each of the first and second signals, and generating the third signal based on the comparison of the determined intensities of the first and second signals.

18. The method as claimed in claim 15, wherein generating the third signal comprises determining a sound quality of audible information within the first and second signals, comparing the sound quality determined for each of the first and second signals, and generating the third signal based on the comparison of the determined sound qualities of the first and second signals.

* * * * *